(12) United States Patent
Kobori

(10) Patent No.: US 9,367,496 B2
(45) Date of Patent: Jun. 14, 2016

(54) DMA TRANSFER DEVICE AND METHOD

(75) Inventor: Tomoyoshi Kobori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 378 days.

(21) Appl. No.: 12/528,893

(22) PCT Filed: Feb. 28, 2008

(86) PCT No.: PCT/JP2008/053510
§ 371 (c)(1),
(2), (4) Date: Aug. 27, 2009

(87) PCT Pub. No.: WO2008/105494
PCT Pub. Date: Sep. 4, 2008

(65) Prior Publication Data
US 2010/0106865 A1 Apr. 29, 2010

(30) Foreign Application Priority Data

Feb. 28, 2007 (JP) ................................ 2007-049976

(51) Int. Cl.
*G06F 13/28* (2006.01)
(52) U.S. Cl.
CPC ...................................... *G06F 13/28* (2013.01)
(58) Field of Classification Search
CPC ....................................................... G06F 13/28
See application file for complete search history.

(56) References Cited

U.S. PATENT DOCUMENTS

| 4,493,048 | A |   | 1/1985  | Kung et al.    |            |
|-----------|---|---|---------|----------------|------------|
| 5,159,665 | A | * | 10/1992 | Priem et al.   | 345/627    |
| 5,541,640 | A | * | 7/1996  | Larson         | 348/14.15  |
| 5,678,063 | A | * | 10/1997 | Odom et al.    | 710/22     |
| 5,948,080 | A | * | 9/1999  | Baker          | 710/37     |
| 6,046,773 | A | * | 4/2000  | Martens et al. | 375/240.25 |
| 7,403,542 | B1| * | 7/2008  | Thompson       | 370/474    |
| 7,437,438 | B2| * | 10/2008 | Mogul et al.   | 709/223    |
| 7,751,439 | B2| * | 7/2010  | El Kolli et al.| 370/468    |
| 8,200,735 | B2| * | 6/2012  | Inoue          | 708/607    |

(Continued)

FOREIGN PATENT DOCUMENTS

| JP | 58-096446 A | 6/1983  |
|----|-------------|---------|
| JP | 04-358384 A | 12/1992 |

(Continued)

OTHER PUBLICATIONS

Supplementary European Search Report for EP 08 71 2081 dated Nov. 5, 2010.

(Continued)

*Primary Examiner* — Henry Tsai
*Assistant Examiner* — John Roche

(57) ABSTRACT

To provide a DMA transfer apparatus and a DMA transfer method capable of reducing traffic on a bus between an external shared memory and DMA controller with less additional hardware to effectively use a memory.

A pattern generation section 11 is provided in a DMA controller 17 and generates data of a predetermined pattern, such as a zero matrix or unit matrix, in the DMA controller when data is transferred from an external shared memory 14 to an internal memory 15. Further, transfer data read out from the external shared memory is temporarily held in a queuing section 13 for queuing. At this time, switching between the transfer data from the queuing section and predetermined pattern data is made based on the number of the transfer data.

12 Claims, 10 Drawing Sheets

(56) References Cited

U.S. PATENT DOCUMENTS

| | | | |
|---|---|---|---|
| 2001/0045988 A1* | 11/2001 | Yamauchi et al. | 348/273 |
| 2002/0009081 A1* | 1/2002 | Sampath et al. | 370/389 |
| 2002/0038407 A1* | 3/2002 | Mounes-Toussi et al. | 711/141 |
| 2002/0140706 A1* | 10/2002 | Peterson et al. | 345/611 |
| 2002/0146013 A1* | 10/2002 | Karlsson et al. | 370/395.6 |
| 2003/0058543 A1* | 3/2003 | Sheedy et al. | 359/630 |
| 2003/0137695 A1* | 7/2003 | Nomizu | 358/1.16 |
| 2003/0152148 A1* | 8/2003 | Laksono | 375/240.24 |
| 2003/0189568 A1* | 10/2003 | Alkouh | 345/422 |
| 2003/0200378 A1* | 10/2003 | Kirsch | 711/1 |
| 2003/0214944 A1* | 11/2003 | Towles | 370/388 |
| 2004/0246250 A1* | 12/2004 | Kaku et al. | 345/419 |
| 2004/0264464 A1* | 12/2004 | Wong | 370/390 |
| 2005/0180437 A1* | 8/2005 | Twomey | 370/401 |
| 2006/0015618 A1* | 1/2006 | Freimuth et al. | 709/226 |
| 2006/0114906 A1* | 6/2006 | Bowes et al. | 370/392 |
| 2006/0197778 A1* | 9/2006 | Peterson et al. | 345/611 |
| 2006/0271919 A1* | 11/2006 | Moyer | 717/136 |
| 2007/0171382 A1* | 7/2007 | Tan et al. | 353/69 |
| 2007/0296613 A1* | 12/2007 | Hussain et al. | 341/50 |
| 2009/0030960 A1* | 1/2009 | Geraghty et al. | 708/203 |
| 2011/0060942 A1* | 3/2011 | Vorbach | 714/6.2 |
| 2014/0032695 A1* | 1/2014 | Michels et al. | 709/212 |

FOREIGN PATENT DOCUMENTS

| | | |
|---|---|---|
| JP | 05-244167 A | 9/1993 |
| JP | 05-336380 A | 12/1993 |
| JP | 6-348273 A | 12/1994 |
| JP | 10-040399 A | 2/1998 |
| JP | 2000-259553 A | 9/2000 |
| JP | 2001-154846 A | 6/2001 |
| JP | 2006-155490 A | 6/2006 |

OTHER PUBLICATIONS

International Search Report for PCT/JP2008/053510 mailed Jun. 3, 2008.

* cited by examiner

DMA TRANSFER DEVICE AND METHOD

This application is the National Phase of PCT/JP2008/053510, filed Feb. 28, 2008, which is based upon and claims the benefit of priority from prior Japanese Patent Application No. 2007-049976 filed on Feb. 28, 2007. The entire contents of Japanese Patent Application No. 2007-049976 are incorporated in contents of the description of the present application.

TECHNICAL FIELD

The present invention relates to an inter-memory data transfer apparatus and particularly, to a DMA (Direct Memory Access) transfer apparatus and a DMA transfer method.

BACKGROUND ART

Miniaturization of an LSI has recently progressed due to advancement of transistor technology. Under such a situation, an architecture, such as systolic array or multiprocessor, that uses a large number of calculation units to exhibit a high parallelism attracts lot of attentions. Whether system performance can be improved or not depends upon how it makes possible for the highly parallel processing architecture to enhance efficiency of traffic of data transfer between memories.

In general, a DMA transfer is used for data transfer between memories in the abovementioned system. FIG. 10 is a view showing a configuration of a DMA transfer apparatus which is a background technique of the present invention. A DMA controller 107 for controlling DMA transfer includes a parameter register 101, a DMA control section 100, and IF 106.

Further, an external shared memory 102, an internal memory 103, a calculation core 108, and a CPU 109 are arranged around the DMA controller 107. The DMA controller 107, external shared memory 102, and CPU 109 are connected to data buses 110 and 111.

In the DMA transfer, the CPU 109 does not directly control data transfer from the external shared memory 102 to internal memory 103. That is, as shown in FIG. 10, parameters such as a memory address offset, data number, and the like are set in the DMA controller 107 so as to allow the DMA controller 107 to control the data transfer. By performing the DMA transfer, a load of the CPU 109 can be reduced.

Techniques relating to the DMA transfer are disclosed in, e.g., JP-A-2001-154846 (Patent Document 1), JP-A-2006-155490 (Patent Document 2), JP-A-05-244167 (Patent Document 3), JP-A-05-336380 (Patent Document 4), and JP-A-10-040399 (Patent Document 5).
Patent Document 1: JP-A-2001-154846
Patent Document 2: JP-A-2006-155490
Patent Document 3: JP-A-05-244167
Patent Document 4: JP-A-05-336380
Patent Document 5: JP-A-10-040399

DISCLOSURE OF THE INVENTION

Problems to be Solved by the Invention

The abovementioned DMA transfer has the following three problems.
(1) Since data of a predetermined pattern, such as a zero matrix or unit matrix is stored in the memory, the use efficiency of the memory is decreased.

(2) In the case where a zero matrix or unit matrix is stored in the external memory, it is necessary to transfer the matrix to the internal memory by means of the DMA transfer, and the transfer is ineffective.
(3) There is available a method of adding a function for generating data in a calculation section in order to increase the memory use efficiency or data transfer rate. In this case, however, it is necessary to change a processing flow depending on whether the predetermined pattern data is handled or not, and therefore the method complicates the system configuration.

The system shown in FIG. 10 has an external shared memory. When performing calculation, the system appropriately transfers data from the external memory to internal memory. In the case where a calculation unit is a systolic array, the simpler a data flow is, the more efficient calculation can be performed.

Thus, even when a zero matrix or unit matrix is used in calculation, it is desirable that the data transfer be performed in the same manner as in the case of ordinary data. Accordingly, it is necessary to ensure a memory area for storing data of a predetermined pattern such as a zero matrix or unit matrix.

The predetermined pattern data is transferred also in the DMA transfer time, causing a redundant transfer. In order to cope with this, there is available a method of adding a function for generating the predetermined pattern in the calculation core so as to improve data transfer rate. In this case, however, it is necessary to change a processing flow depending on whether the predetermined pattern data is handled or not, complicating the system configuration.

An exemplary object of the present invention is to provide a DMA transfer apparatus and a DMA transfer method capable of reducing traffic on a bus between an external shared memory and DMA controller with less additional hardware to effectively use a memory.

According to the present invention, there is provided a DMA transfer apparatus that performs DMA transfer between memories, which includes:
a pattern generation section that generates predetermined pattern data;
a queuing section that synchronizes transfer data read out from one memory with the predetermined pattern data generated in the pattern generation section; and
a determination section that determines the size of the transfer data, wherein
switching is performed between the transfer data from the queuing section and predetermined pattern data generated in the pattern generation section based on a determination result of the determination section so as to add the predetermined pattern data to a data stream transferred from the one memory and transfer the resultant data to the other memory.

Further, according to the present invention, there is provided a DMA transfer method of a DMA transfer apparatus that performs DMA transfer between memories, which includes the steps of:
generating predetermined pattern data;
synchronizing transfer data read out from one memory with the generated predetermined pattern data;
determining the size of the transfer data, and
performing switching between the synchronized transfer data and generated predetermined pattern data based on a determination result on the size of the transfer data so as to add the predetermined pattern data to a data stream transferred from the one memory and transfer the resultant data to the other memory.

Advantages of the Invention

According to the present invention, by adding the pattern generation section for generating the predetermined pattern data in the DMA transfer apparatus, it is possible to reduce the amount of data transferred on a bus connecting a memory of the DMA transfer apparatus and a DMA transfer source memory, thereby improving use efficiency of the DMA transfer source memory. Further, the predetermined pattern data are previously stored in the DMA transfer destination memory, so that an operation flow can be simplified. That is, it is not necessary to put the predetermined pattern data on the bus connecting the DMA transfer source memory and DMA transfer apparatus, simplifying the system configuration.

Further, if the amount of data to be transferred can be reduced, the bus can be utilized also for data transfer between the DMA transfer source memory and another unit, thereby improving performance of the entire system. This is achieved also because of the elimination of the need of storing the predetermined pattern data in the DMA transfer source memory. As another advantage, a certain area of the DMA transfer destination memory can be reset by only the processing in the DMA transfer apparatus, without intervention of the CPU.

EXPLANATION OF REFERENCE SYMBOLS

Figure 1:
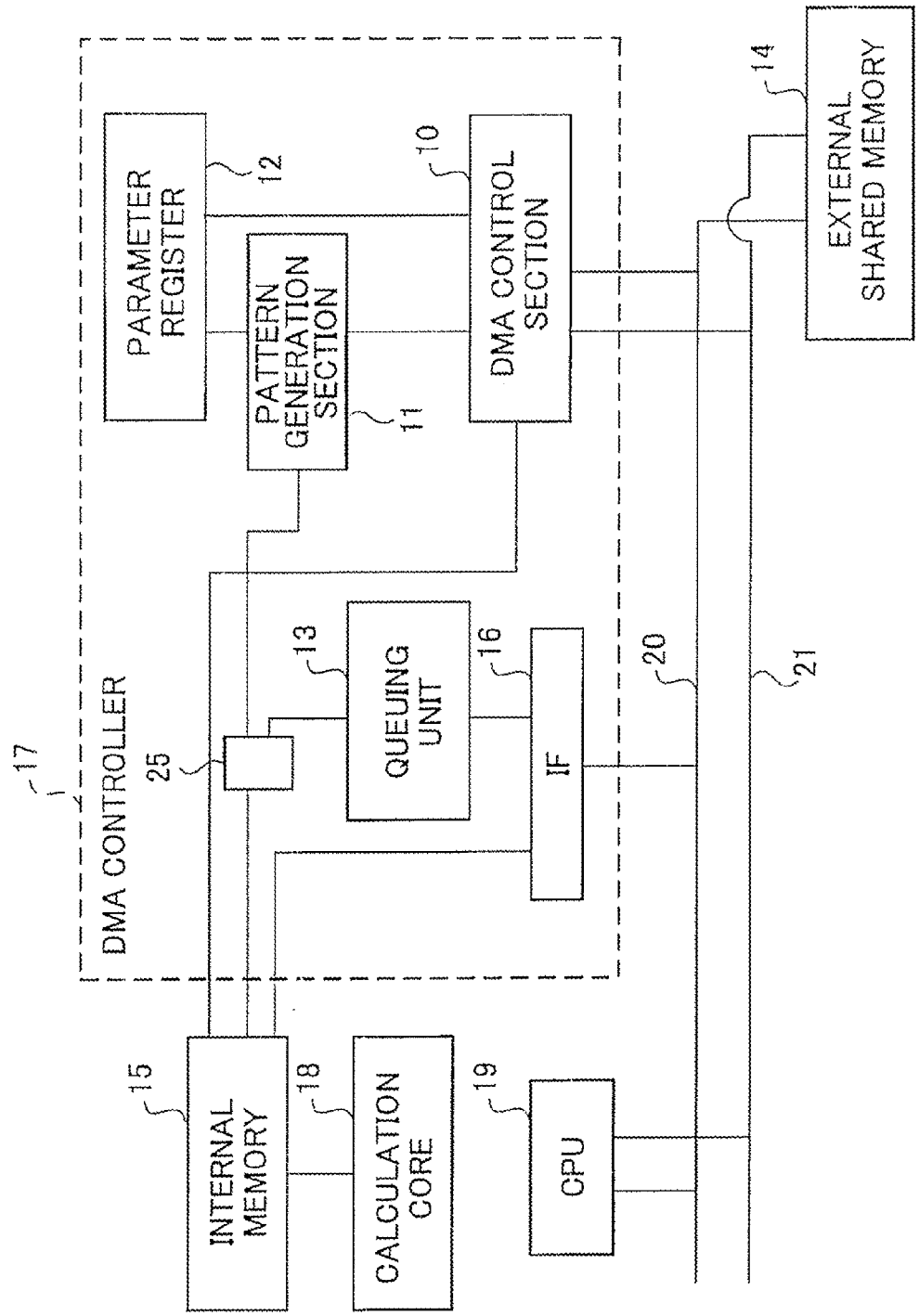
FIG. 1 is a block diagram showing a first embodiment of a DMA transfer apparatus according to the present invention.

10: DMA control section
11: Pattern generation section
12: Parameter register
13: Queuing unit
14: External shared memory
15: Internal memory
16: Memory data IF
17: DMA controller
18: Calculation core
19: CPU
20: Data bus
21: Address bus
22: Index decoder
23: Counter
24: Selector
25: Multiplexer

BEST MODE FOR CARRYING OUT THE INVENTION

Preferred embodiments for practicing the present invention will be described in detail below with reference to the accompanying drawings. Exemplary embodiments of the present invention assume a system that uses DMA transfer to perform data transfer from an external shared memory to an internal memory and handles large volume of data in an internal calculation core for, e.g., performing matrix calculation. In the matrix calculation, data of a predetermined pattern, such as a zero matrix or unit matrix is often handled.

The data of a predetermined pattern such as a zero matrix or unit matrix is temporarily stored in an internal memory or external memory as in the case of other calculation data and transferred to a calculation core according to need (however, in the case where the predetermined pattern data is temporarily stored in the internal memory, since the internal memory is limited in capacity, the predetermined pattern data is overwritten by other data when it is not used in the subsequent calculation).

The DMA transfer described as the background technique performs inter-memory data transfer based on the number of data or address offset set as a parameter. Thus, in the case where a zero matrix or unit matrix is required to be calculated using the same calculation path as that used by ordinary calculation data, it is necessary to include the zero matrix or unit matrix in the data to be subjected to inter-memory transfer by the DMA controller.

The preferred embodiments aim to generate the predetermined pattern in the DMA controller and add the predetermined pattern data to transfer data from the external share memory so as to reduce the amount of data transferred on a bus connecting the DMA controller and external shared memory and improve use efficiency of the external share memory. Further, the preferred embodiments aim to eliminate the need of putting the predetermined pattern data on the bus connecting the external shared memory and DMA controller at the time of DMA transfer so as to simplify the system configuration.

More specifically, in the preferred embodiments, a pattern generation section is provided in the DMA controller and generates data of a predetermined pattern, such as a zero matrix or unit matrix, in the DMA controller when data is transferred from one memory to another memory. Further, transfer data read out from the one memory is temporarily held in a queuing section for queuing. At this time, switching between the transfer data from the queuing section and predetermined pattern data is made based on the number of the transfer data. The predetermined pattern data is added to a data stream to be transferred in this manner and the resultant data stream is transferred to the memory. Hereinafter, representative embodiments of the present invention will be described in detail with reference to the accompanying drawings.

(First Embodiment)

FIG. 1 is a block diagram showing a system including a first embodiment of a DMA transfer apparatus according to the present invention. A DMA controller 17 serving as the DMA transfer apparatus is connected between an internal memory 15 and an external shared memory 14. The DMA controller 17 performs data transfer between memories (internal memory 15 and external shared memory 14).

The DMA controller 17 includes a DMA control section 10 that controls DMA transfer, a pattern generation section 11 that generates predetermined pattern data, and a parameter register 12 that stores parameters used for the pattern generation.

The predetermined pattern generated by the pattern generation section 11 is predetermined pattern data such as a zero matrix or unit matrix. The pattern generation section 11 generates the predetermined pattern based on parameters stored in the parameter register 12, such as a pattern index, added data size, insertion offset or insertion timing, and the like.

The DMA controller 17 further includes a queuing unit 13, a multiplexer 25, and a memory data IF 16. The queuing unit 13 synchronizes the output timing of data transferred from the external shared memory 14 with output timing of predetermined pattern data output from the pattern generation section 11. The multiplexer 25 selectively outputs the transfer data from the queuing unit 13 and predetermined pattern from the pattern generation section 11 to the internal memory 15. The memory data IF 16 is connected to the internal memory 15 and queuing unit 13.

The internal memory 15, external shared memory 14, calculation core 18, and a CPU 19 are arranged around the DMA controller 17. A data bus 20 and an address bus 21 connect the DMA controller 17, CPU 19, and external shared memory 14.

The external shared memory 14 is a memory set as a transfer source or destination of the DMA transfer. The calculation core 18 performs matrix calculation using DMA-transfer data. The CPU 19 issues a command to the DMA controller 17. The DMA transfer of the DMA controller 17 is controlled by the command from the CPU 19 connected to the data bus 20 connecting the external shared memory 14 and DMA controller 17.

Figure 2:
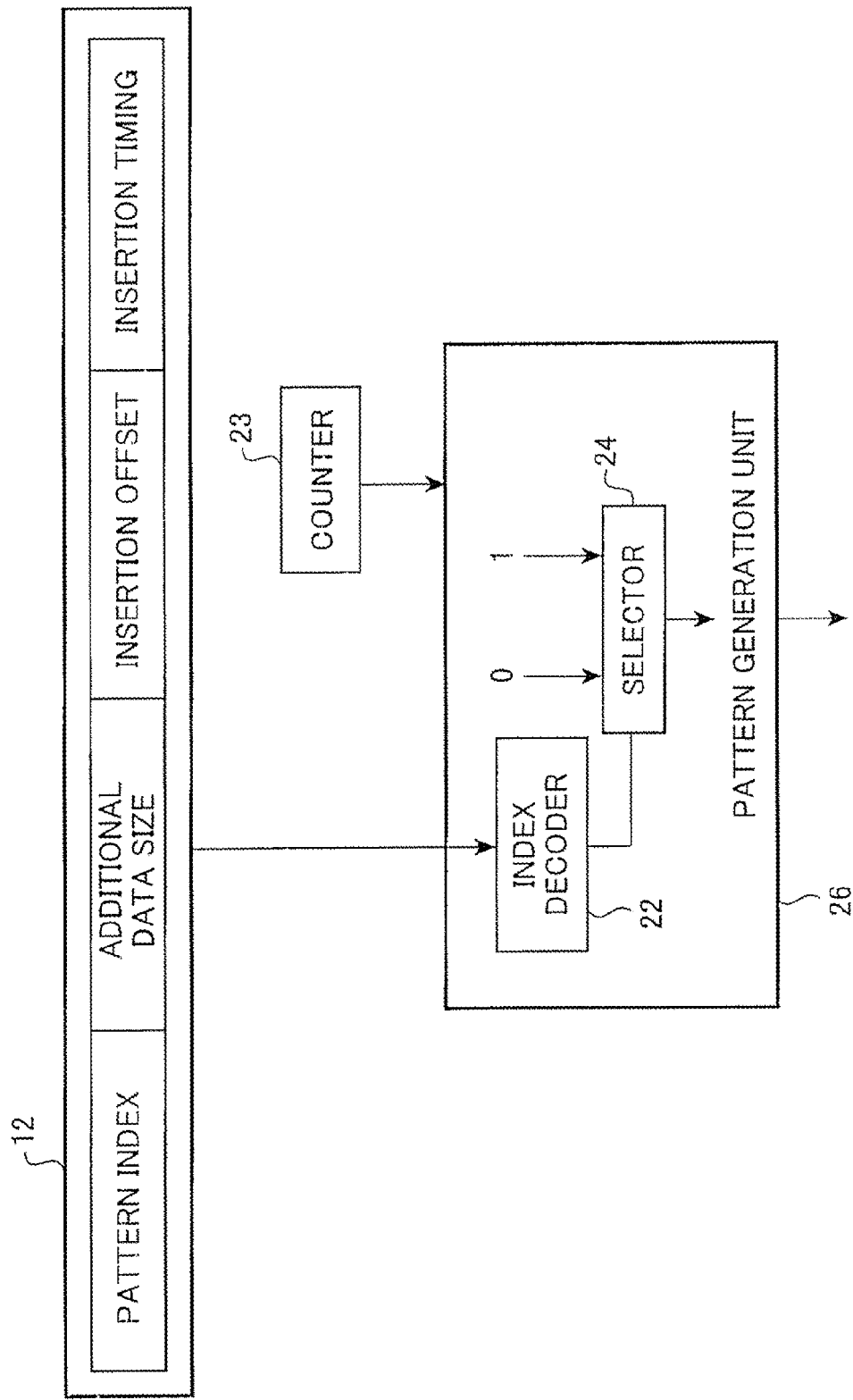
FIG. 2 is a block diagram showing a pattern generation section according to the first embodiment.

FIG. 2 shows an example of configurations of the pattern generation section 11 and parameter register 12. The parameters stored in the parameter register 12 will first be described. The pattern index is a parameter for determining which pattern is to be output, and added data size is a parameter indicating the size of a predetermined pattern to be inserted. The insertion offset is a parameter indicating the timing at which the predetermined pattern is inserted into the transfer data for the first time. The insertion timing is a parameter indicating the insertion interval of the predetermined pattern in the case where the insertion of the predetermined pattern is performed a plurality of times.

As described later in detail, when the amount of transfer data counted by a counter 23 coincides with the insertion timing, the data to be output to the internal memory 15 is switched from the transfer data to predetermined pattern. The parameters stored in the parameter register 12 are set by the CPU 19.

The pattern generation section 11 includes a counter 23 and a pattern generation unit 26. The pattern generation unit 26 has an index decoder 22 and a selector 24. The index decoder 22 generates, as a control signal, timing for generating a unit matrix, zero matrix, or the like, based on the pattern index, etc., stored in the parameter register 12 and outputs it to the selector 24. The selector 24 selects 0 or 1 in accordance with the control signal from the index decoder 22 and generates the predetermined pattern data such as a zero matrix or unit matrix.

The counter 23 counts the number of transfer data from the external shared memory 14. The value counted by the counter 23 is used to determine the data size of the transfer data, and the timing at which the data to be output to the internal memory 15 is switched from the transfer data to predetermined pattern data is adjusted.

Figure 3:
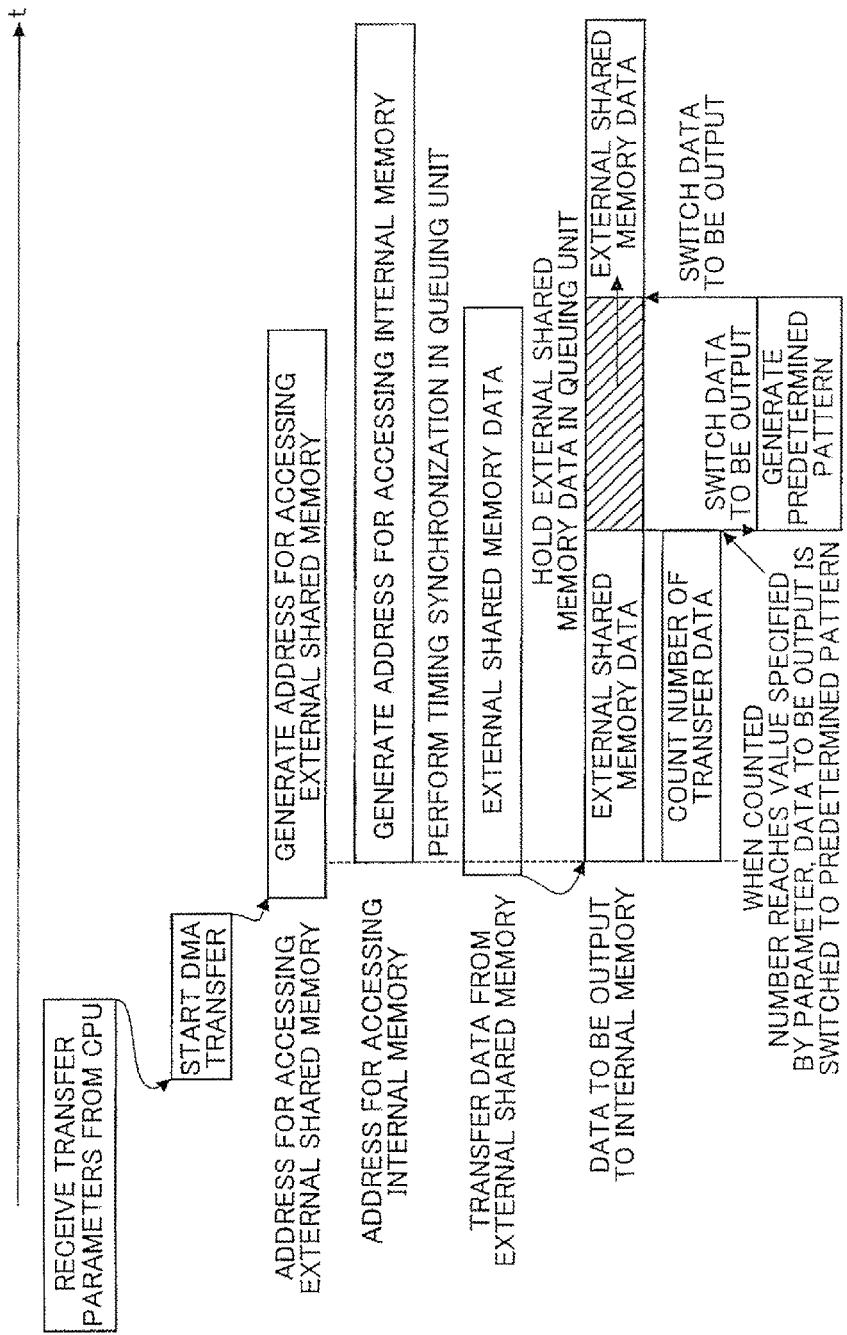
FIG. 3 is a timing chart for explaining DMA transfer according to the first embodiment.

With reference to FIGS. 1, 2, and 3, a DMA transfer operation according to the present embodiment will be described.

FIG. 3 is a timing chart of the DMA transfer according to the present embodiment. In the following operation, the DMA transfer is assumed to be conducted from the external shared memory 14 to internal memory 15.

First, as shown in FIG. 3, the DMA controller 17 receives, from the CPU 19, a DMA transfer command, a data size, a beginning address, and parameters required for pattern generation, such as the pattern index, added data size, and insertion offset or insertion timing and starts DMA transfer. At this time, the parameters required for pattern generation is set in the parameter register 12 by the CPU 19.

The DMA controller 17 then generates an address for accessing the external shared memory, starts accessing the external shared memory 14, and reads out, from the external shared memory 14, data at a specified address area by an amount corresponding to a specified data size. At the same time, the counter 23 starts counting the number of the transfer data. The operations described above are performed under the control of the DMA control section 10. The same can be said for the following description.

The data read out from the external shared memory 14 is once transferred to the queuing unit 13 in the DMA controller 17 through the IF 16. In synchronization with input of data into the queuing unit 13, the DMA controller 17 generates an address for accessing the internal memory as shown in FIG. 3 and outputs it to the internal memory 15 together with the transfer data input to the queuing unit 13.

The queuing unit 13 is organized as a FIFO (First-In First-Out) and can output both data and address at one clock cycle if data insertion is not made. When the value of the number of DMA transfer data counted by the counter 23 reaches the timing (insertion offset stored in the parameter register 12 shown in FIG. 2), the predetermined pattern data transferred from the pattern generation section 11 is selected by the multiplexer 25 and output to the internal memory 15.

When the predetermined pattern is generated in the pattern generation section 11, "0" or "1" is selected by the selector 24 in accordance with the pattern index for determining which predetermined pattern is to be output which is set as a parameter in the parameter register 12 as described above, and thereby the predetermined pattern data such as a zero matrix or unit matrix is generated. At this time, the pattern generation section 11 generates the predetermined pattern data in accordance with the added data size indicating the size of the predetermined pattern which is set in the parameter register 12 as described above.

While the predetermined pattern data from the pattern generation section 11 is output to the internal memory 15, data transferred from the external shared memory 14 is held in the queuing unit 13. Upon completion of output of the predetermined pattern data, the transfer data held in the queuing unit 13 is output again to the internal memory 15 together with the address generated in the DMA controller 17.

In the case where the predetermined pattern is inserted into the transfer data successively, the same operation as described above is performed. However, in the case of the second or subsequent time of the insertion operation of the predetermined pattern, data to be output is switched from the transfer data to predetermined pattern data in accordance with the insertion timing indicating the insertion interval of the predetermined pattern which is set in the parameter register 12 so that the predetermined pattern is inserted into the transfer data at constant intervals. The predetermined pattern is added to a data stream transferred from the external shared memory 14 in this manner, and the resultant data stream is transferred to the internal memory 15.

Although the data value output from the pattern generation section 11 is set to a value of 0 or 1 in the present embodiment, the value is not limited to this.

(Second Embodiment)

Figure 4:
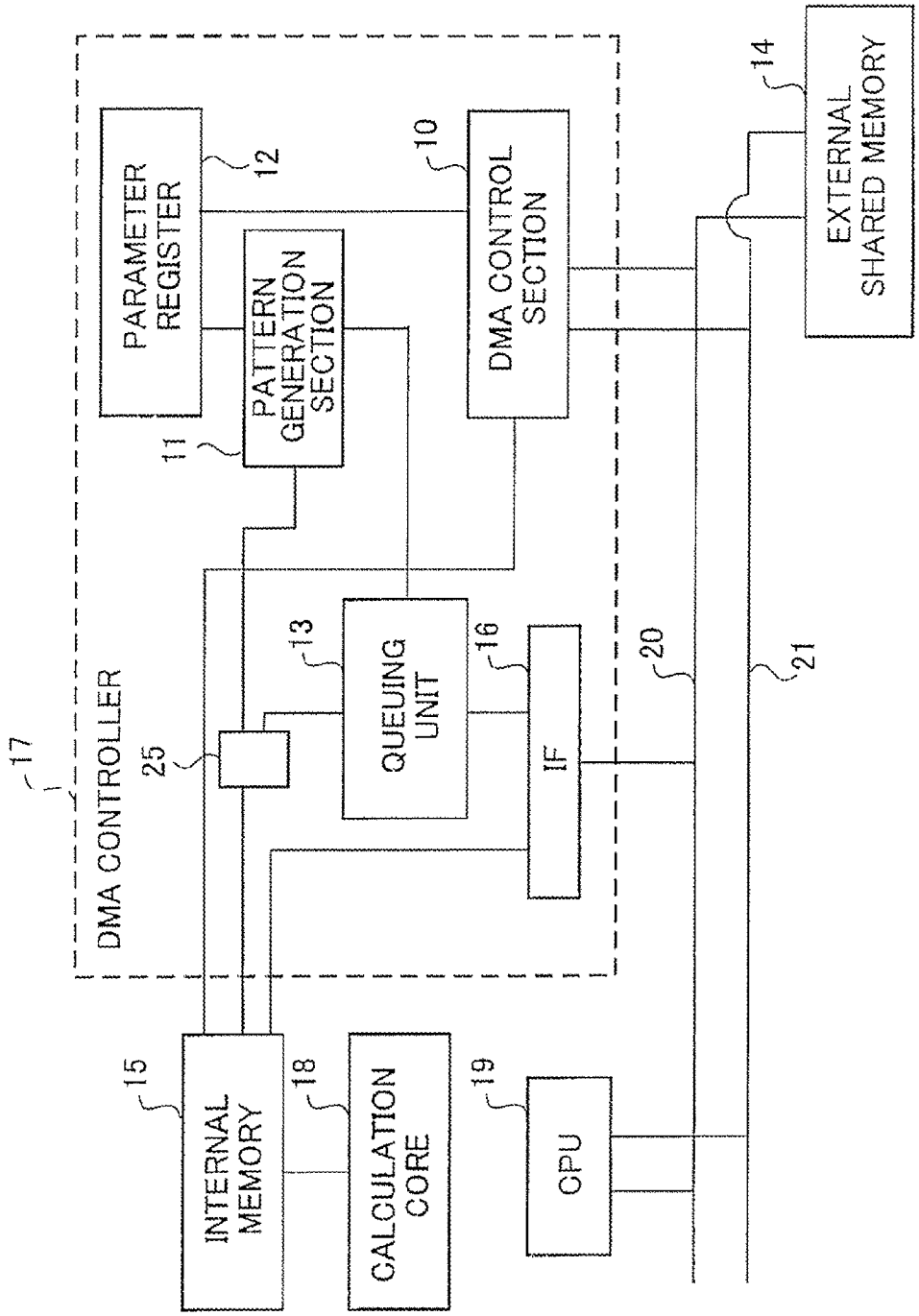
FIG. 4 is a block diagram showing a system including a second embodiment of the DMA transfer apparatus according to the present invention.

FIG. 4 is a block diagram showing a system including a second embodiment of the DMA transfer apparatus according to the present invention. In FIG. 4, the same reference numerals as those in FIG. 1 denote the same parts as those in FIG. 1. The second embodiment differs from the first embodiment in the point that the data output from the queuing unit 13 is used as a parameter in the pattern generation section 11 and in the configuration of the pattern generation section 11. Except for the above points, the configuration of the second embodiment is the same as that of the first embodiment shown in FIG. 1.

In the first embodiment, assumed is a case where a unit matrix or zero matrix is generated in the manner as described above, and a value to be input to the selector 24 is 0 or 1. In the present embodiment, data transferred from the pattern generation section 11 and a value of the parameter index are used to select one of arbitrary two data stored in the parameter register 12 to generate the predetermined pattern. The DMA transfer in the present embodiment can be used in a case where a pattern to be inserted is changed depending on the type of data like a packet header.

The DMA controller 17 includes the DMA control section 10, pattern generation section 11, parameter register 12, queuing unit 13, multiplexer 25, and memory data IF 16. The DMA control section 10 controls DMA transfer. The pattern generation section 11 generates a predetermined pattern. The parameter register 12 stores parameters used for pattern generation. The queuing unit 13 synchronizes the output timing of data transferred from the external shared memory 14 with output timing of predetermined pattern output from the pattern generation section 11.

The multiplexer 25 selectively outputs the transfer data from the queuing unit 13 and predetermined pattern from the pattern generation section 11 to the internal memory 15. The memory data IF 16 is connected to the internal memory 15 and queuing unit 13.

The internal memory 15, external shared memory 14, calculation core 18, and CPU 19 are arranged around the DMA controller 17. The data bus 20 and address bus 21 connect the DMA controller 17, CPU 19, and external shared memory 14.

The external shared memory 14 is a memory set as a transfer source or destination of the DMA transfer. The internal memory 15 is a memory set as a transfer source or destination of the DMA transfer. The DMA transfer of the DMA controller 17 is controlled by a command from the CPU 19 connected to the data bus 20 connecting the external shared memory 14 and DMA controller 17.

Figure 5:
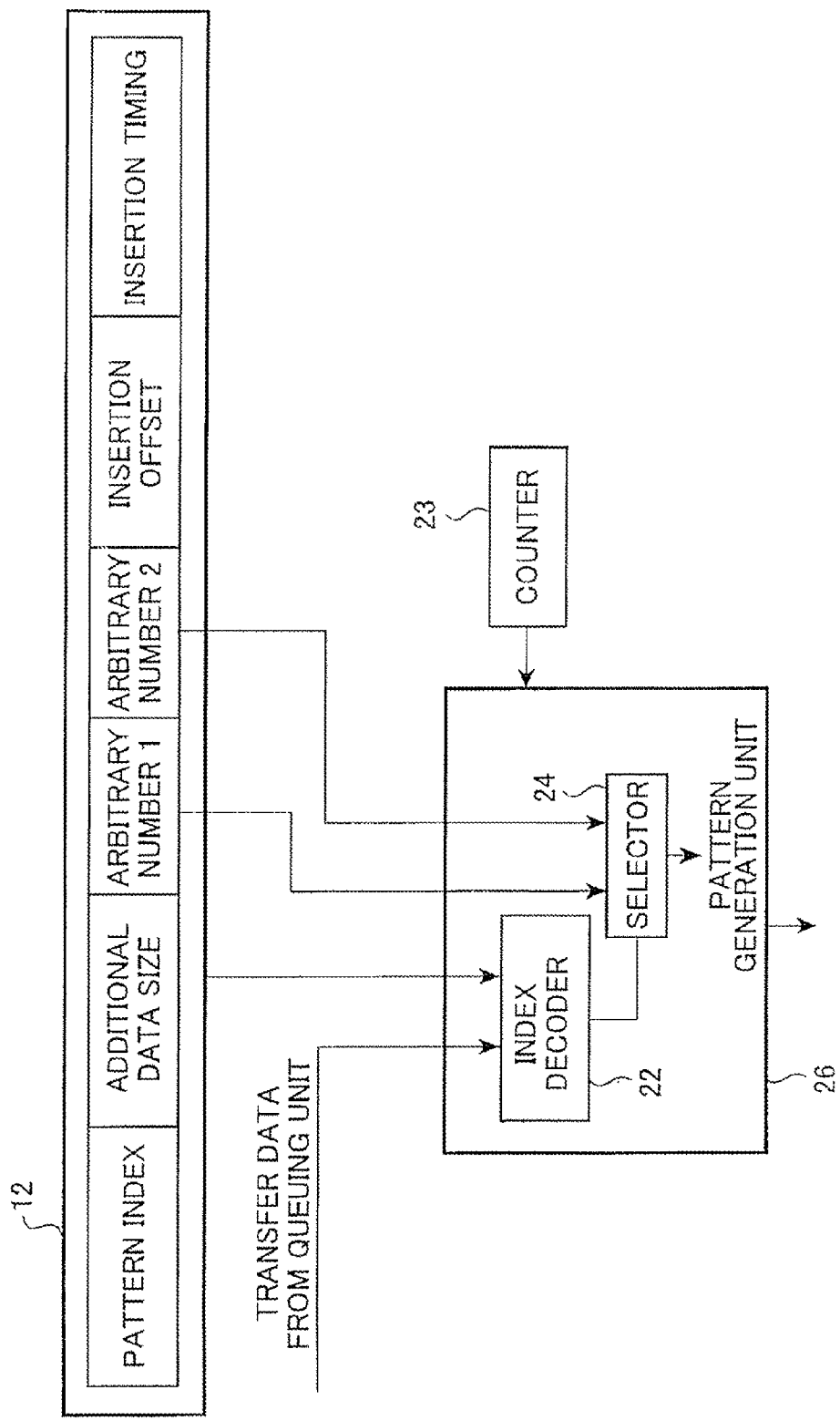
FIG. 5 is a block diagram showing the pattern generation section according to the second embodiment.

FIG. 5 shows configurations of the pattern generation section 11 and parameter register 12. The added data size, insertion offset, and insertion timing are the same as those described in FIG. 2. In addition to the above parameters, arbitrary numbers 1 and 2 are set in the parameter register 12.

The pattern generation unit 26 has the index decoder 22 and selector 24. The index decoder 22 generates, as a control signal, timing for generating the predetermined pattern based on the parameters stored in the parameter register 12.

The control signal and transfer data are input as parameters to the selector 24, and the selector 24 selects the arbitrary number 1 or 2 in accordance with the control signal and transfer data and outputs the selected arbitrary number as the predetermined pattern.

The counter 23 counts the number of transfer data from the external shared memory 14. The value counted by the counter 23 is used to determine the data size of the transfer data, and the timing at which the predetermined pattern is inserted is adjusted.

Figure 6:
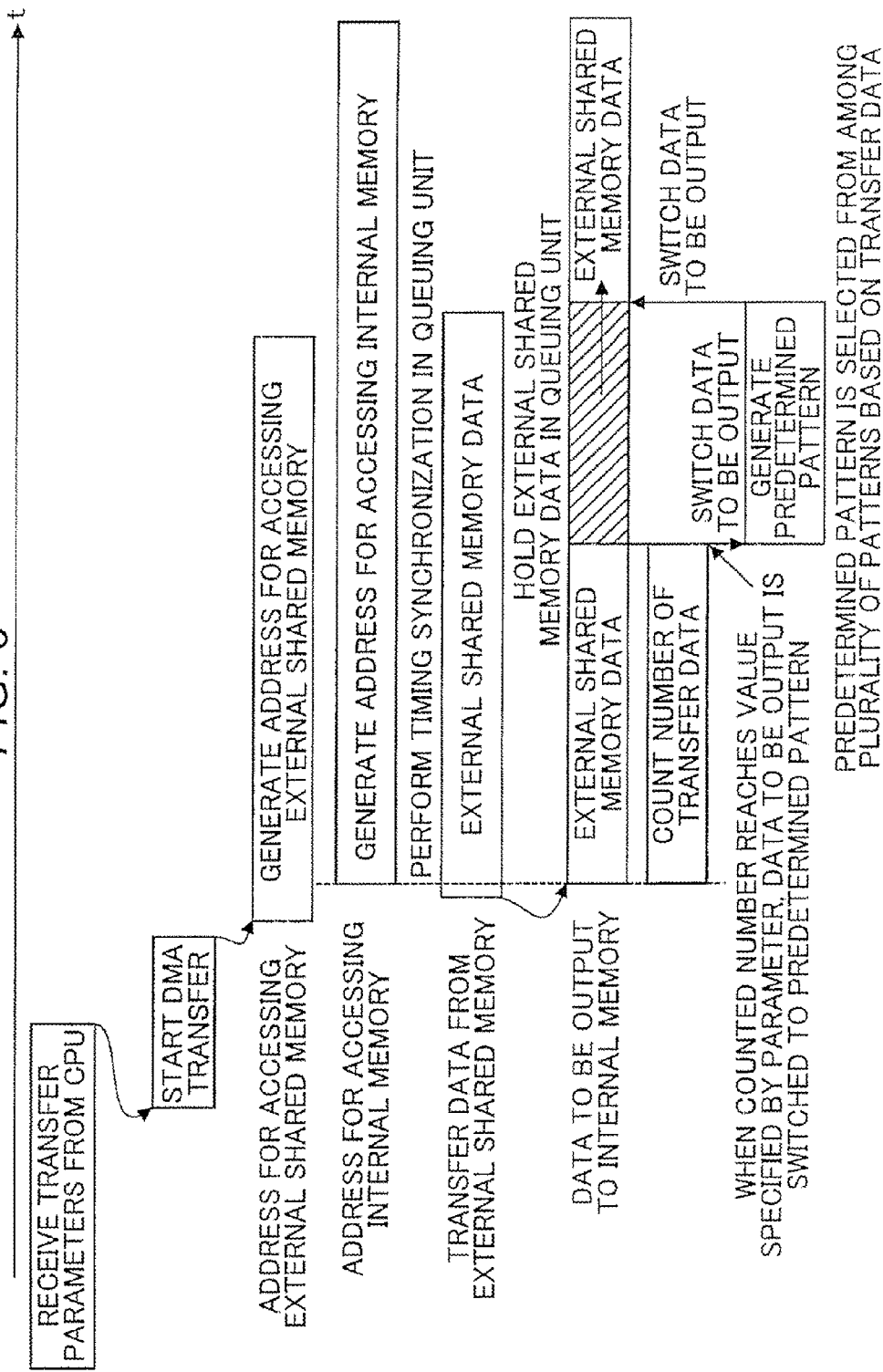
FIG. 6 is a timing chart for explaining the DMA transfer according to the second embodiment.

With reference to FIGS. 4, 5, and 6, a DMA transfer operation according to the present embodiment will be described. FIG. 6 is a timing chart of the DMA transfer according to the present embodiment. In the following operation, the DMA transfer is assumed to be conducted from the external shared memory 14 to internal memory 15.

The DMA transfer operation according to the present embodiment is basically the same as that of the first embodiment shown in FIG. 3 but differs in that the predetermined pattern is generated by selecting the arbitrary number 1 or 2 in the selector 24, that is, the predetermined pattern generated in the pattern generation section 11 differs depending on the type of data.

First, the DMA controller 17 receives, from the outside CPU 19, a DMA transfer command, a data size, a beginning address, and parameters required for pattern generation, such as the pattern index and added data size and starts DMA transfer.

The DMA controller 17 then generates an address for accessing the external shared memory, starts accessing the external shared memory 14, and reads out, from the external shared memory 14, data at a specified address area by an amount corresponding to a specified data size. At the same time, the counter 23 starts counting the number of the transfer data.

The data read out from the external shared memory 14 is once transferred to the queuing unit 13 in the DMA controller 17. In synchronization with input of data into the queuing unit 13, the DMA controller 17 generates an address for accessing the internal memory as shown in FIG. 6 and outputs it to the internal memory 15 together with the transfer data input to the queuing unit 13.

The queuing unit 13 is organized as a FIFO and can output both data and address at one clock cycle if data insertion is not made. When the value of the number of DMA transfer data counted by the counter 23 reaches the timing specified by a parameter (insertion offset stored in the parameter register 12 shown in FIG. 5), data to be output is switched to the predetermined pattern data transferred from the pattern generation section 11, and the predetermined pattern is output to the internal memory 15.

At this time, whether the arbitrary number 1 or 2 specified as the predetermined pattern is to be output is selected depending on the data transferred from the external shared memory 14. For example, when the transfer data is "1", the arbitrary number 1 is selected; and when the transfer data is "0", the arbitrary number 2 is selected. Then, the number of the arbitrary number 1 or 2 is selected based on the pattern index to thereby generate the predetermined pattern data. The pattern generation section 11 generates the predetermined pattern data in accordance with the added data size indicating the size of the predetermined pattern which is set in the parameter register 12.

While the predetermined pattern data from the pattern generation section 11 is output to the internal memory 15, data transferred from the external shared memory 14 is held in the queuing unit 13. Upon completion of output of the predetermined pattern data, the transfer data held in the queuing unit 13 is output again to the internal memory 15 together with the address generated in the DMA controller 17.

In the case where the predetermined pattern is inserted into the transfer data successively, the same operation as above is performed. In the case of the second or subsequent time of the insertion operation of the predetermined pattern, data to be output is switched from the transfer data to predetermined pattern in accordance with the insertion timing indicating the insertion interval of the predetermined pattern which is set in the parameter register 12 so that the predetermined pattern is inserted into the transfer data at constant intervals. The predetermined pattern is added to a data stream transferred from the external shared memory 14 in this manner, and the resultant data stream is transferred to the internal memory 15.

(Third Embodiment)

A third embodiment of the present invention will next be described. The third embodiment is a modification of the second embodiment and differs from the second embodiment in the configuration of the pattern generation section 11 and predetermined pattern insertion process. Except for the above points, the configuration of the third embodiment is the same as that of the second embodiment shown in FIG. 4.

Figure 7:
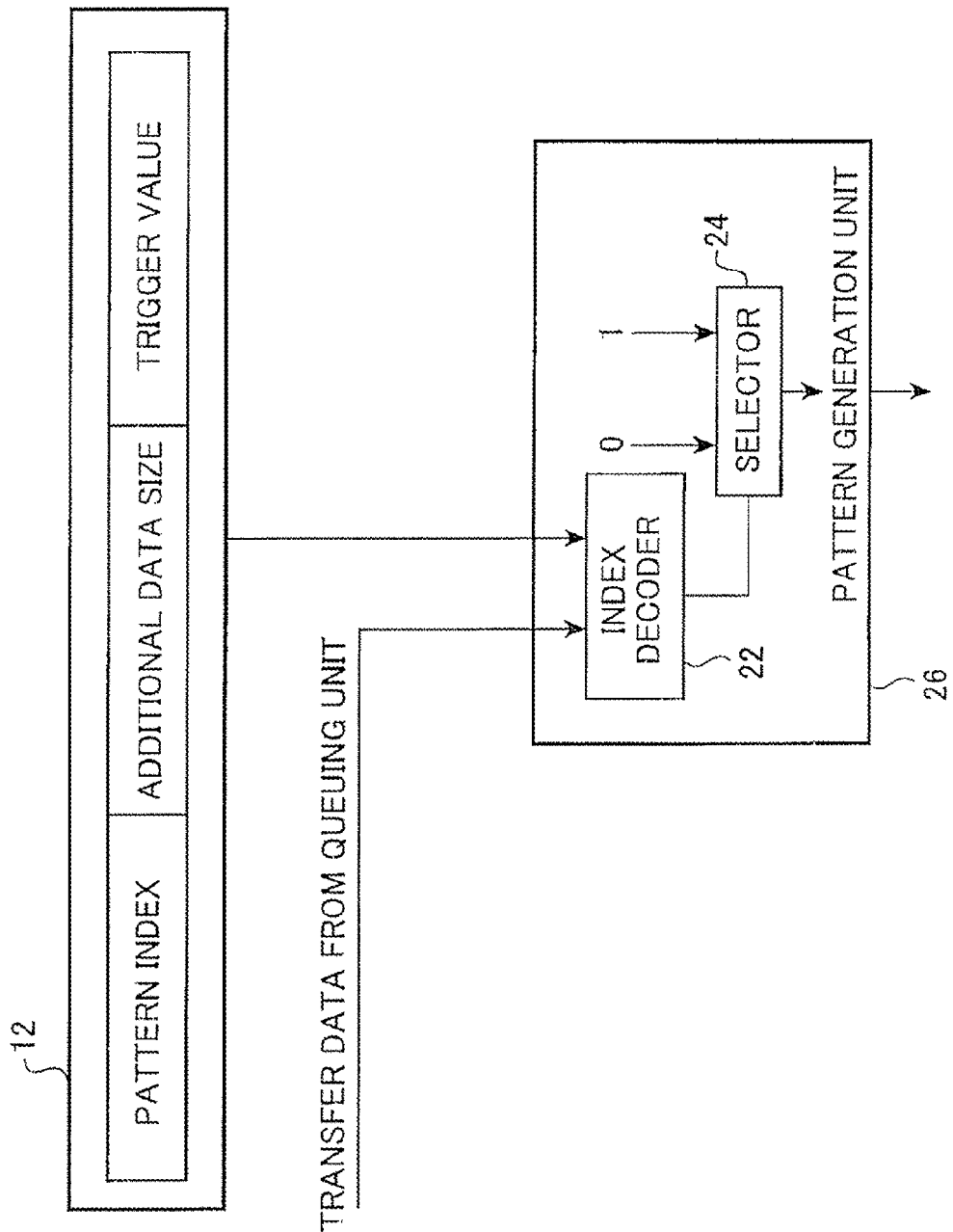
FIG. 7 is a block diagram showing the pattern generation section according to a third embodiment of the present invention.

FIG. 7 shows a configuration of the pattern generation section 11 according to the present embodiment. In FIG. 7, the same reference numerals as those in FIG. 5 of the second embodiment denote the same parts as those in FIG. 5. The pattern index and added data size of parameter register 22 are the same as those described in FIG. 2. A trigger value is a parameter for switching between the transfer data and predetermined pattern.

The index decoder 22 outputs, as a control signal, timing for selecting a predetermined pattern to be inserted based on the trigger value and transfer data from the queuing unit 13, to the selector 24. The selector 24 selects 0 or 1 stored in the parameter register 12 based on the control signal from the index decoder 22 and outputs it as the predetermined pattern.

The present embodiment can be used in a case where the predetermined pattern generated in the pattern generation section 11 is DMA-transferred when the DMA transfer data from the external shared memory 14 represents a certain value (this value is assumed to previously be stored in the parameter register 12).

Figure 8:
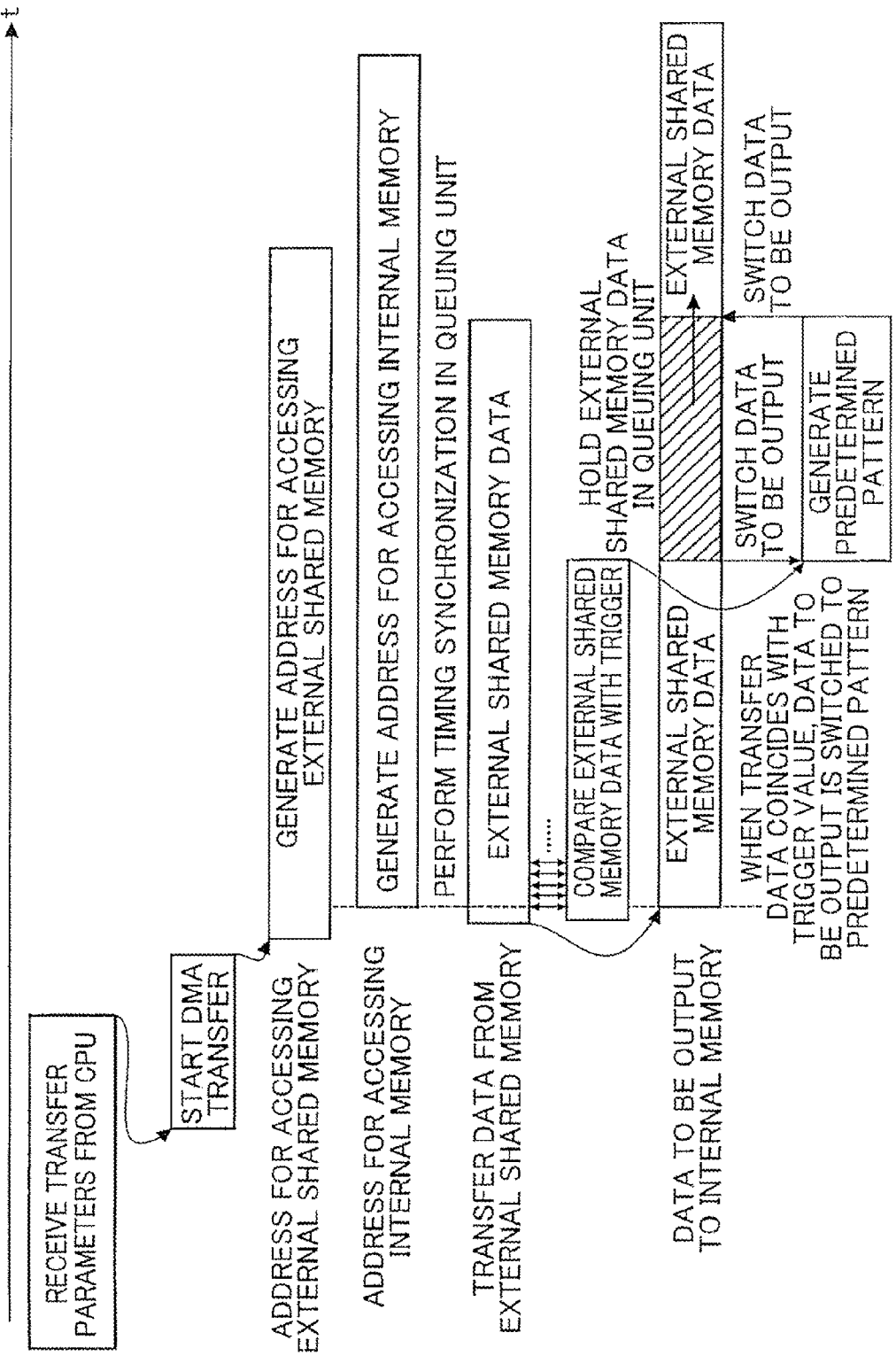
FIG. 8 is a timing chart for explaining the DMA transfer according to the third embodiment.

FIG. 8 is a timing chart of the DMA transfer according to the present embodiment. The DMA transfer operation according to the present embodiment is basically the same as that of the second embodiment shown in FIG. 6 but differs in that the transfer data from the external shared memory 14 is used for switching between the transfer data from the external shared memory 14 and predetermined pattern. Except for the above point, the operation of the third embodiment is the same as that of the second embodiment.

First, the DMA controller 17 receives a DMA transfer command from the CPU 19 and starts DMA transfer. Then the counter 23 starts counting operation, an address for accessing the external shared memory is generated by the DMA controller 17, and data is red out from the external shared memory 14.

The data read out is once transferred to the queuing unit 13 in the DMA controller 17. In synchronization with input of data into the queuing unit 13, the DMA controller 17 generates an address for accessing the internal memory and outputs it to the internal memory 15 together with the transfer data input to the queuing unit 13.

Further, as shown in FIG. 8, the transfer data of the external shared memory 14 transferred from the queuing unit 13 and trigger value specified by the parameter are compared during the DMA transfer. At the time point when the transfer data and trigger value coincide with each other, data to be output is switched from the transfer data to predetermined pattern. For example, when all 1s of 32-bit data in the transfer data coincide with all 1s of 32-bit data of the trigger value, data to be output is switched from the transfer data to predetermined pattern. Upon completion of output of the predetermined pattern, the transfer data from the external shared memory 14 held in the queuing unit 13 is output to the internal memory 13.

While the predetermined pattern is output, the transfer data from the external shared memory 14 is held in the queuing unit 13. Upon completion of transfer of the predetermined pattern data, the data to be output is switched, and the transfer data held in the queuing unit 13 is output to the internal memory 15. The same operation as above is repeated to add the predetermined pattern data generated in the pattern generation section 11 to a data stream transferred from the external shared memory 14 and transfer the resultant data stream to the internal memory 15.

(Fourth Embodiment)

A fourth embodiment of the present invention will be described. The fourth embodiment is a modification of the first embodiment and differs from the first embodiment in the following point. That is, the timing of inserting the predetermined pattern used in the pattern generation section 11 that generates the predetermined pattern is specified using the number of data in the first embodiment; while in the fourth embodiment, the timing is specified using time (clock cycle) required from the start of the DMA transfer. Except for the above point, the configuration of the fourth embodiment is the same as that of the first embodiment.

Concretely, the fourth embodiment differs from the first embodiment in the operation of the pattern generation section 11. That is, at the time point when the DMA controller 17 receives a DMA command and the like from the CPU 19, the counter 23 starts counting operation and outputs the number of cycles required for the DMA transfer. The value output from the counter 23 is compared with a parameter indicating the DMA transfer timing which is set in the parameter register 12. When the value output from the counter 23 reaches the specified timing, the predetermined pattern generated in the pattern generation section 11 is DMA-transferred.

Figure 9:
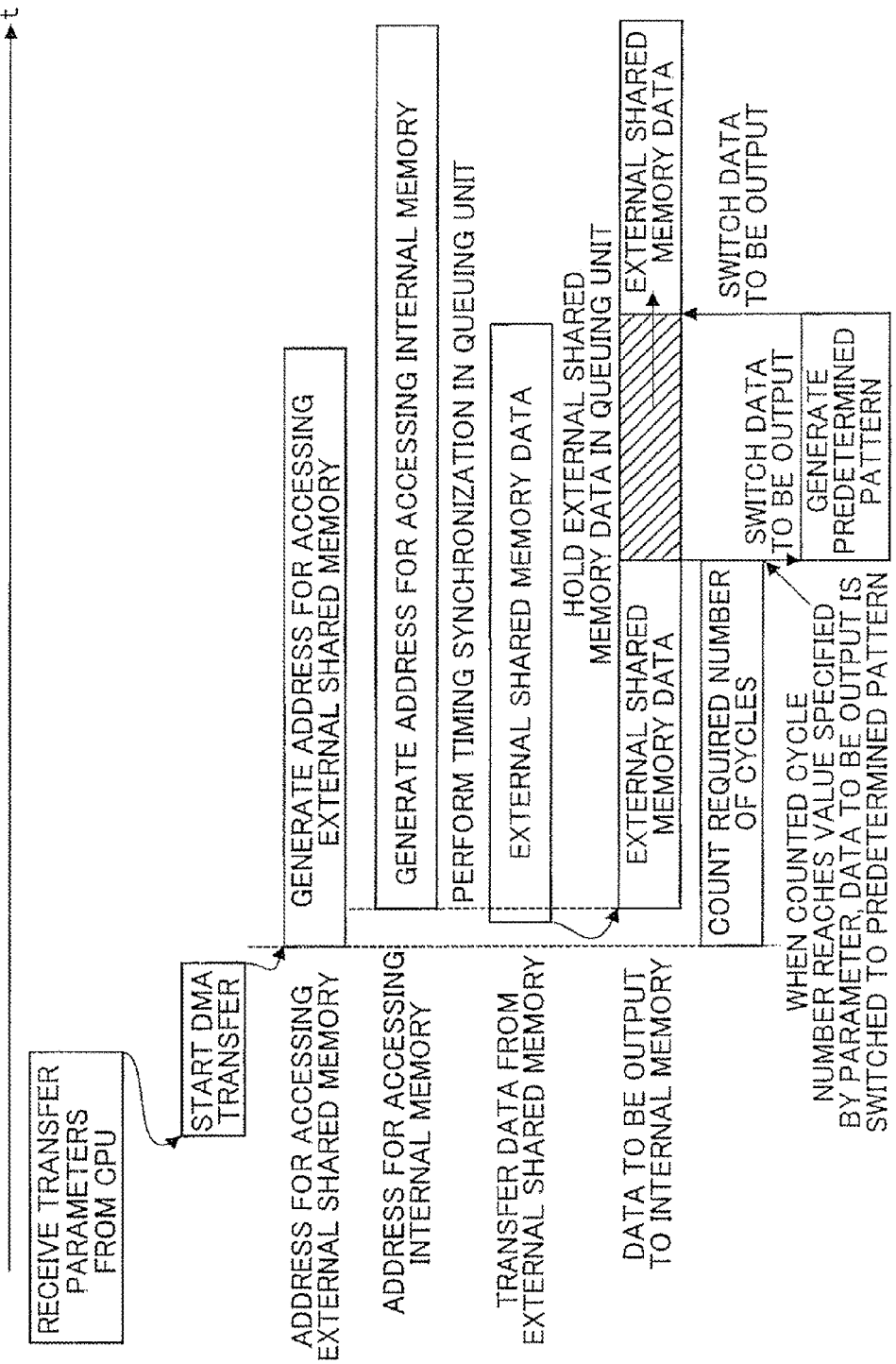
FIG. 9 is a timing chart for explaining the DMA transfer according to the fourth embodiment.
Figure 10:
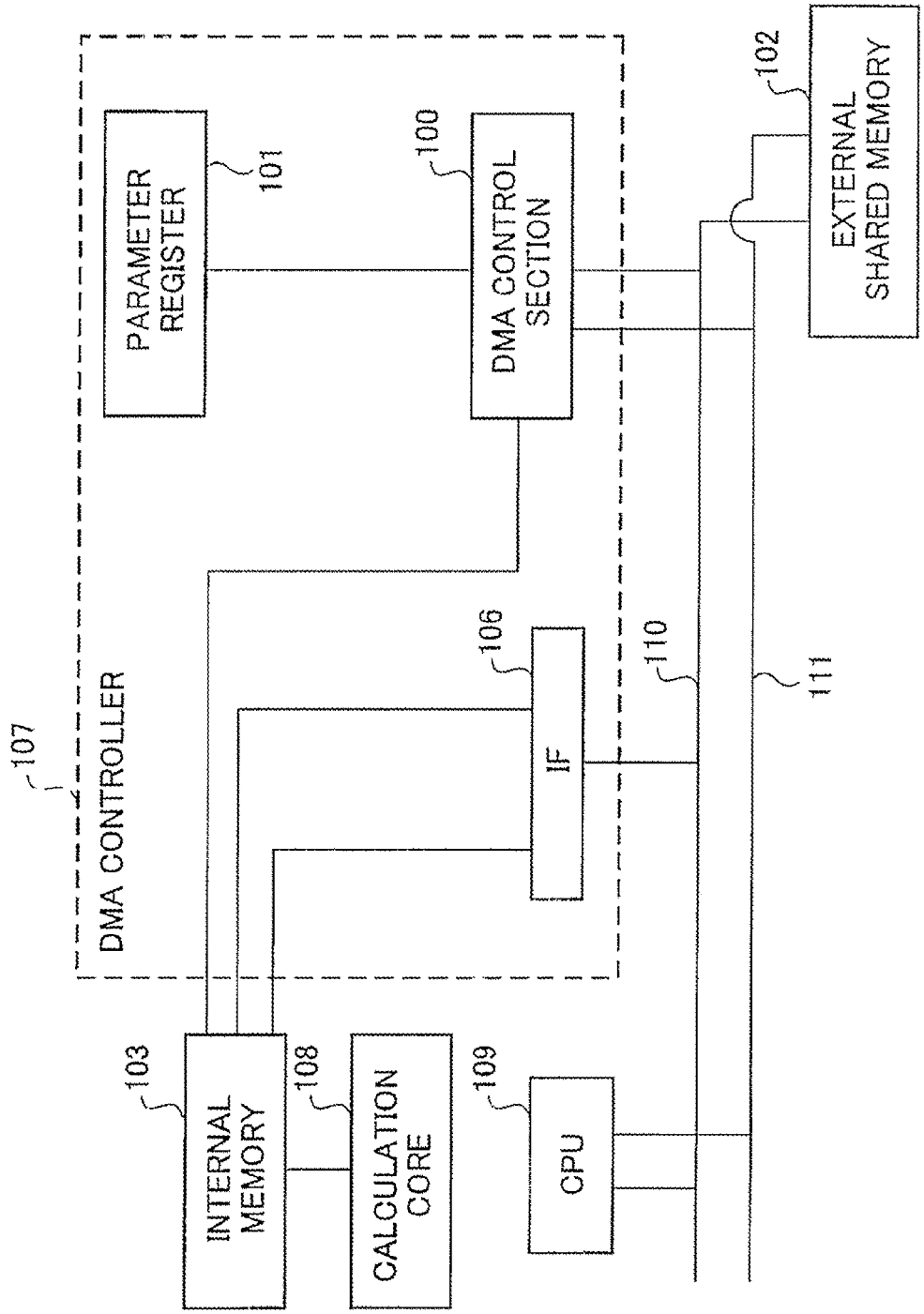
FIG. 10 is a block diagram showing a DMA transfer apparatus which is a background of the present invention.

FIG. 9 is a timing chart of the DMA transfer according to the present embodiment. The DMA transfer operation according to the present embodiment is basically the same as that of the first embodiment shown in FIG. 3 but differs in that the predetermined pattern data is output when the number of cycles counted by the counter 23 reaches a specified value. Except for the above point, the operation of the fourth embodiment is the same as that of the first embodiment.

First, upon start of the DMA transfer, the counter 23 starts counting operation. Further, an address for accessing the external shared memory is generated in the DMA controller 17, and data is read out from the external shared memory 14.

The data read out is once transferred to the queuing unit 13 in the DMA controller 17. In synchronization with input of data into the queuing unit 13, the DMA controller 17 generates an address for accessing the internal memory and outputs it to the internal memory 15 together with the transfer data input to the queuing unit 13.

When the count value of the counter 23 reaches a value (insertion offset) specified by the parameter, the predetermined pattern is generated in the pattern generation section 11. As shown in FIG. 9, the data to be output is switched from the transfer data from the external shared memory 14 to the predetermined pattern data in this timing, and the predetermined pattern data is transferred to the internal memory 15.

While the predetermined pattern is output, data transferred from the external shared memory 14 is held in the queuing unit 13. Upon completion of transfer of the predetermined pattern data, the transfer data similarly retained in the queuing unit 13 is output to the internal memory 15 instead of the predetermined pattern.

In the case where the predetermined pattern is inserted into the transfer data successively, data to be output is switched from the transfer data to predetermined pattern in accordance with the insertion timing indicating the insertion interval of the predetermined pattern so that the predetermined pattern is inserted into the transfer data at constant intervals, as in the case of the first embodiment. The predetermined pattern is added to a data stream transferred from the external shared memory 14 in this manner, and the resultant data stream is transferred to the internal memory 15.

Although the DMA transfer according to the fourth embodiment has been described as a modification of the first embodiment, it may be applied to the DMA transfer according to the second embodiment.

The above embodiments have been described with an assumption that data is DMA-transferred from the external shared memory to internal memory, however, needless to say, the present invention may be applied to the DMA transfer from the internal memory to external shared memory.

Although the exemplary embodiments of the present invention have been described in detail, it should be understood that the present invention can be practiced in various forms without departing from the sprit and scope of the invention as defined by the appended claims. Thus, the above embodiments are merely illustrative and should not be considered restrictive in any way. The scope of the present invention is defined by the appended claims and not restricted by the descriptions of the specification and abstract. Further, all variations and modifications which come within the equivalent range of the claims are embraced in the scope of the present invention.

INDUSTRIAL APPLICABILITY

The present invention can suitably be applied to a digital signal processor such as a data communication processor that performs matrix calculation/filtering for large volume of stream data.

The invention claimed is:

1. A DMA transfer apparatus that is disposed between a source memory and a destination memory and performs DMA transfer from the source memory and the destination memory, comprising:
    a pattern generation section that generates predetermined pattern data which will be transferred to the destination memory;
    a queuing section that receives transfer data which is continuously output from the source memory, and queues the transfer data so as to synchronize the transfer data with the predetermined pattern data generated in the pattern generation section; and
    a measuring section that measures the size of the transfer data which has been transferred; and
    a multiplexer which is configured to insert the predetermined pattern data into the transfer data in such a way that the predetermined pattern data is started to be inserted when the measuring section indicates that the size of the transfer data which has been transferred reaches a predetermined size and in such a way that a rest part of the transfer data which has relinquished a right of transfer to the inserted predetermined pattern data is delayed by the queuing section and follows the predetermined pattern data, wherein
    a plurality of types of the predetermined pattern data are prepared, and
    the pattern generation section generates the predetermined pattern data based on both of a parameter indicating which pattern data is to be output and a parameter indicating the size of the predetermined pattern data per each of the plurality of types of the predetermined pattern data.

2. The DMA transfer apparatus according to claim 1, wherein
    a parameter indicating timing of inserting the predetermined pattern data first and a parameter indicating timing of inserting the predetermined pattern into the transfer data are sent from a CPU, and
    the pattern generation section inserts the predetermined pattern data into the transfer data based on the parameters.

3. The DMA transfer apparatus according to claim 1, wherein
    the measuring section measures the size of the transfer data by counting the number of pieces of data which have been DMA transferred.

4. The DMA transfer apparatus according to claim 1, wherein
    the measuring section measures the size of the transfer data by counting the number of clock cycles which have been used for the DMA transfer.

5. The DMA transfer apparatus according to claim 1, wherein
    the source memory and the destination memory are, respectively, an external shared memory and an internal memory, or an internal memory and an external shared memory,
    the DMA transfer is data transfer between the external shared memory and the internal memory, and
    the predetermined pattern data is a unit matrix or zero matrix.

6. The DMA transfer apparatus according to claim 1, wherein
    the source and the destination memory are coupled to each other through a bus, and
    the DMA transfer apparatus further comprises a data interface to the bus, a parameter register that stores parameters sent from a CPU for use in generating the predetermined pattern data, and a DMA control section that controls the DMA transfer.

7. A DMA transfer method of a DMA transfer apparatus that is disposed between a source memory and a destination memory and performs DMA transfer from the source memory to the destination memory, comprising:
    generating predetermined pattern data which will be transferred to the destination memory;
    receiving transfer data which is continuously output from the source memory, and queuing the transfer data so as to synchronize the transfer data with the generated predetermined pattern data; and
    measuring the size of the transfer data which has been transferred, and
    inserting the predetermined pattern data into the transfer data in such a way that the predetermined pattern data is started to be inserted when the size of the transfer data which has been transferred reaches a predetermined size and in such a way that a rest part of the transfer data which has relinquished a right of transfer to the inserted predetermined pattern data is delayed by the queuing section and follows the predetermined pattern data, wherein
    a plurality of types of the predetermined pattern data are prepared, and
    the pattern generation section generates the predetermined pattern data based on both of a parameter indicating which pattern data is to be output and a parameter indicating the size of the predetermined pattern data per each of the plurality of types of the predetermined pattern data.

8. The DMA transfer method according to claim 7, wherein the predetermined pattern data is inserted into the transfer data based on a parameter indicating timing of inserting the predetermined pattern data first sent from a CPU and a parameter indicating timing of inserting the predetermined pattern into the transfer data.

9. The DMA transfer method according to claim 7, wherein the size of the transfer data is determined by counting the number of data to be DMA transferred.

10. The DMA transfer method according to claim 7, wherein the size of the transfer data is determined by counting the number of clock cycles required for the DMA transfer.

11. The DMA transfer method according to claim 7, wherein
the source memory and the destination memory are, respectively, an external shared memory and an internal memory, or an internal memory and an external shared memory,
the DMA transfer is data transfer between the external shared memory and the internal memory, and
the predetermined pattern data is a unit matrix or zero matrix.

12. The DMA transfer method according to claim 7, wherein
the source and the destination memory are coupled to each other through a bus, and
a parameter register stores parameters sent from a CPU for use in generating the predetermined pattern data.

* * * * *